2,987,347
ENDLESS TRACK AND SPROCKET
John Cook and Ruby F. Cook, both of 4183 S. Pacific Highway 99, Grants Pass, Oreg., and Geraldine J. Rouse, 140 Landsided Lane, Grants Pass, Oreg.
Filed May 20, 1959, Ser. No. 814,544
6 Claims. (Cl. 305—23)

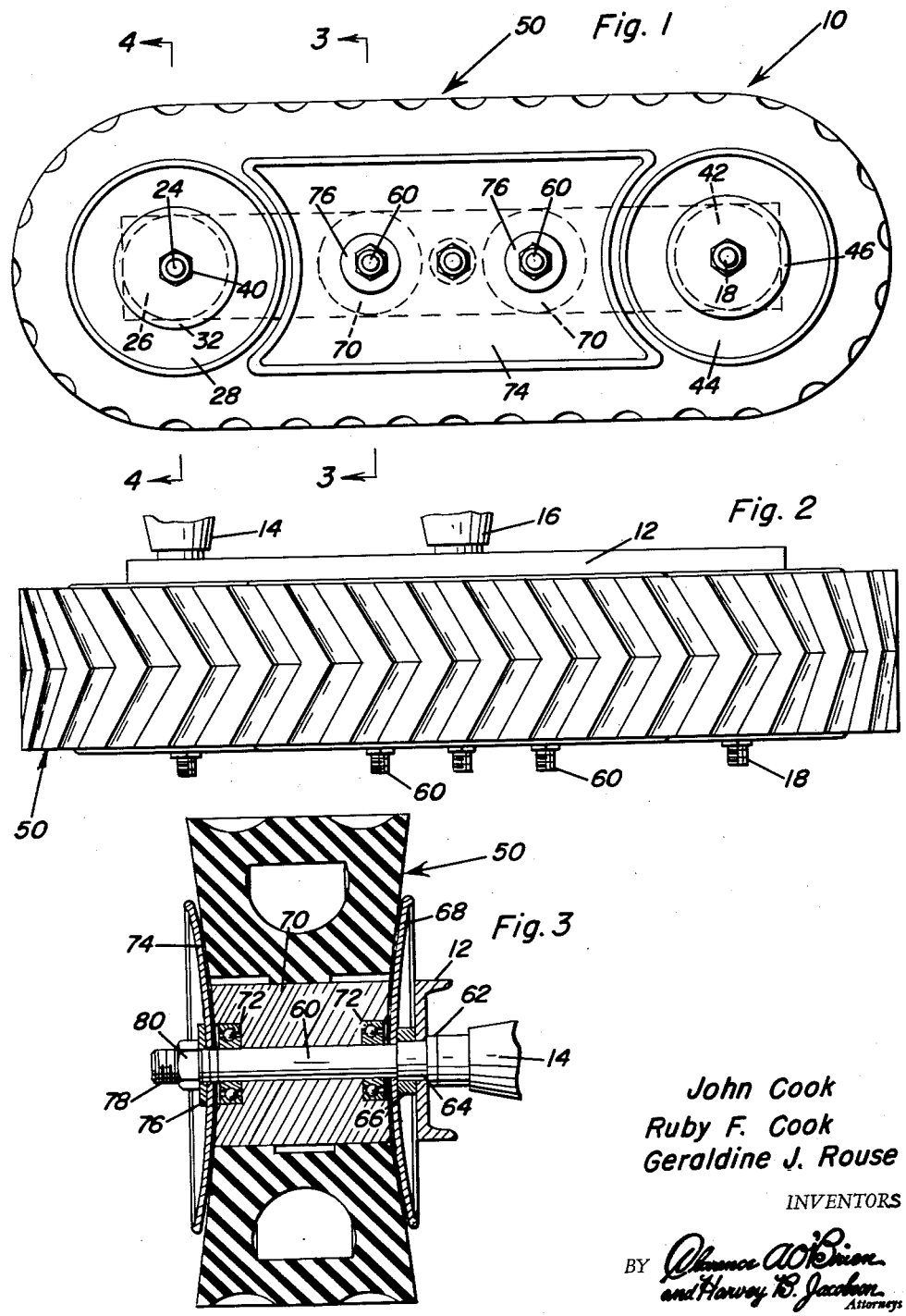
June 6, 1961
J. COOK ET AL
2,987,347
ENDLESS TRACK AND SPROCKET
Filed May 20, 1959
2 Sheets-Sheet 1
John Cook
Ruby F. Cook
Geraldine J. Rouse
INVENTORS June 6, 1961  J. COOK ET AL  2,987,347
ENDLESS TRACK AND SPROCKET
Filed May 20, 1959  2 Sheets-Sheet 2
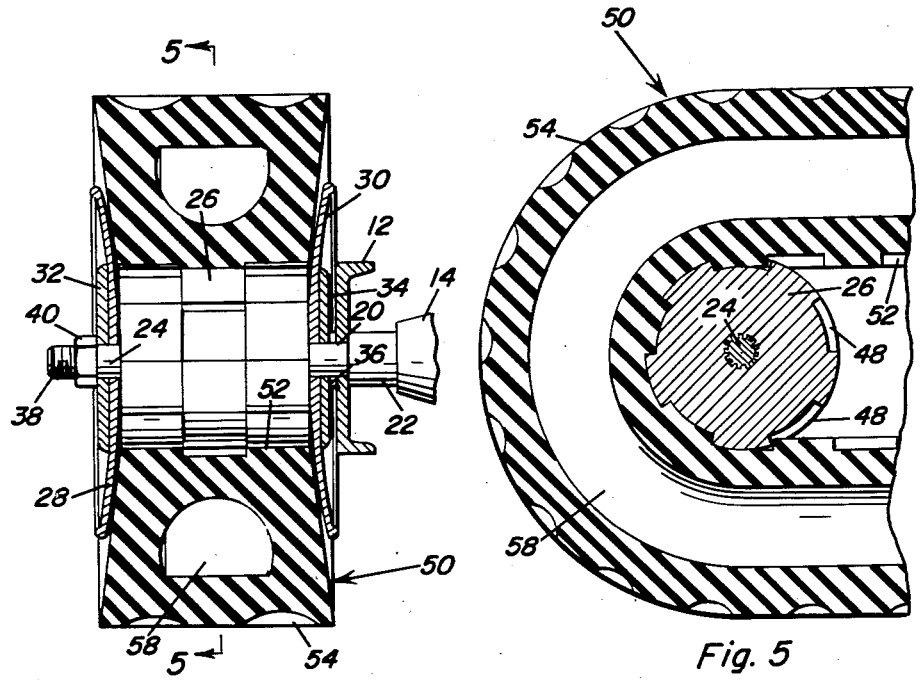
Fig. 4
Fig. 5
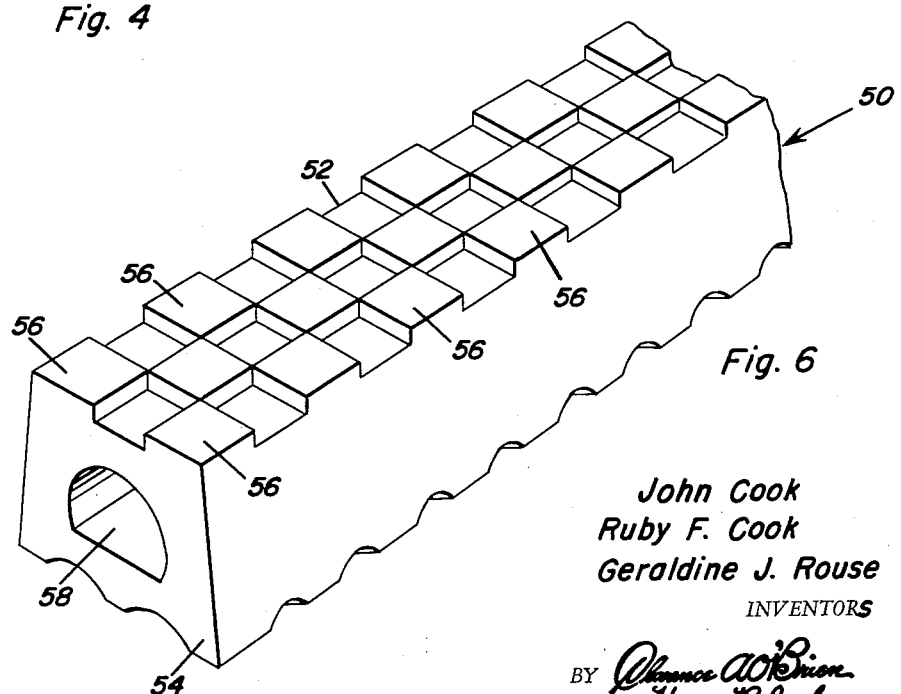
Fig. 6
John Cook
Ruby F. Cook
Geraldine J. Rouse
INVENTORS

United States Patent Office 2,987,347
Patented June 6, 1961

This invention relates in general to new and useful improvements in ground engaging supports for vehicles, and more specifically to a novel endless track and sprocket assembly.

The primary object of this invention is to provide a novel endless track assembly wherein the endless track assembly is extremely compact in that the endless track member extends only a relatively short distance so that the endless track assembly may replace wheels of existing and new vehicles.

Another object of the invention is to provide an endless track assembly wherein the endless track member is of a tubular construction so as to have resiliency and thus increase the roadability of a vehicle of which the endless track assembly is a component.

Still another object of the invention is to provide an endless track assembly which includes an elongated support having a pair of shafts extending from opposite ends thereof, a roller type support, carried by each of the shafts, an endless track member extending around the roller type support members, and there being provided suitable guide plates for retaining the endless track member in alignment with the roller type support members.

A still further object of the invention is to provide a novel endless track assembly wherein the endless track member thereof is supported by a pair of end sprockets and the central portion thereof is supported by a pair of rollers disposed intermediate the sprockets, the rollers and the sprockets having the same effective diameters whereby the intermediate rollers prevent the central deflection of the endless track member due to the load placed thereon and at the same time provide a support for the upper run of the endless track member between the end sprockets.

A still further object of the invention is to provide an endless track assembly which includes a main support shaft for securing the endless track assembly to a vehicle, and a drive shaft, the drive shaft being drivingly connected to one of the sprockets of the endless track assembly and the endless track member and the sprockets therefor having cooperating interfitting surfaces whereby the endless track member may be driven from one of the sprockets.

These together with other objects and advantages which will become subsequently apparent reside in the details of construction and operation as more fully hereinafter described and claimed, reference being had to the accompanying drawings forming a part hereof, wherein line numerals refer to like parts throughout, and in which:

FIGURE 1 is a side elevational view of the endless track assembly and shows the arrangement of the guide plates thereof;

FIGURE 2 is a plan view of the endless track assembly with only stub portions of the shafts thereof being shown;

FIGURE 3 is a transverse vertical sectional view taken substantially upon the plane indicated by the section line 3—3 of FIGURE 1 and shows the specific construction of the endless track assembly in the area of one of the intermediate rollers, the view being on a large scale;

FIGURE 4 is a transverse vertical sectional view taken substatnially upon the plane indicated by the section line 4—4 of FIGURE 1 and shows the cross-section of the endless track assembly through one of the sprockets;

FIGURE 5 is a fragmentary longitudinal sectional view taken substantially upon the plane indicated by the section line 5—5 of FIGURE 4 and shows further the relationship of the endless track member and one of the sprockets; and FIGURE 6 is an enlarged fragmentary perspective view of a section of the endless track member and shows the specific design of the underside of the base thereof.

Referring now to the drawings in detail, it will be seen that the endless track assembly, which is the subject of this invention, is referred to in general by the reference numeral 10. The endless track assembly 10 includes an elongated support 12 which has been illustrated as being in the form of a channel member. A drive shaft, which has been diagrammatically shown at 14, extends through one end of the support 12. A supporting shaft, which has been diagrammatically shown at 16, is secured to a central part of the support 12 for mounting the endless track assembly on a vehicle. An undershaft 18 is carried by the support 12 remote from the drive shaft 14 and in the same corresponding position with respect to the center of the endless track assembly.

Reference is now had to FIGURE 4 wherein the general details of the drive shaft 14 and other components of the endless track assembly are illustrated. The drive shaft 14 extends through and is rotatably journaled in the support 12 as at 20. It is to be understood that the invention is only illustrated diagrammatically and for that reason no bearing has been shown here although a bearing would be desirable. The drive shaft 14 includes an enlarged portion 22 which abuts against the right or outer surface of the support 12 to limit the relative movement of the drive shaft 14 with respect to the support 12. The drive shaft 14 also includes a reduced spindle portion 24 which is externally splined and which has a drive sprocket 26 fitting thereon in interlocked relation. A pair of concave circular guide plates 28 and 30 are disposed on opposite sides of the drive sprocket 26. Backing plates 32 and 34 are disposed outwardly of the guide plates 28 and 30, respectively. The backing plate 34 is spaced from the support 12 by a thrust washer 36. The extreme end of the drive shaft 14 is externally threaded as at 38 and a retaining nut 40 is threaded thereon.

The shaft 18 is an idler shaft and is carried by the support 12. The shaft 18 does not need to rotate in that it includes an idler sprocket 42 which is rotatably journaled on the shaft 18. The idler sprocket 42 has associated therewith guide plates 44, which are identical with the guide plates 28 and 30 and which are backed by backing plates 46, which are identical with the backing plates 32 and 34. The external configurations of the drive sprocket 26 and the idler sprocket 44 will be the same. It is to be noted that the drive sprocket, as illustrated in FIGURES 4 and 5, has a plurality of pockets 48 formed in the surface thereof. The pockets 48 are staggered both transversely and circumferentially about the surface of the sprockets 26 and 42.

An endless track member, generally referred to by the numeral 50, is entrained over the drive sprocket 26 and the idler sprocket 42. The endless track member has a base 52 and a tread 54, the endless track member 52 flaring outwardly from the base 52 to the tread 54 so that the tread 54 is of a much greater width. The base 52 includes a plurality of projecting blocks 56 which correspond in outline to the recesses or pockets 48. The blocks 56 are staggered both transversely and circumferentially of the endless track member 50.

The endless track member 50 is of a circumference to extend about the drive sprocket 26 and the idler sprocket 42 and has straight runs between the two. In order to increase the resiliency and flexibility of the endless track member 50 it is of a tubular construction, there being a continuous bore 58 extending through the endless track member. This is best shown in FIGURES 4, 5 and 6. Also, the tread 54 may have any desired surface for obtaining traction. In FIGURE 2, the tread is illustrated at being of the double herringbone type. Other tread designs may be used.

A pair of intermediate shafts are carried by the support 12 on opposite sides of the support shaft 16. The intermediate shafts are identical to the idler shaft 18 and are referred to by the numeral 60. Each of the intermediate shafts 60 includes an enlarged head 62 which abuts the outer surface of the support 12, as is shown in FIGURE 3. Also, the intermediate shaft 60 is provided with an enlarged portion 64 immediately adjacent the enlarged head 62, the enlarged portion 64 being seated within the support 12 and projecting slightly inwardly thereof. A spacer 66 is carried by the enlarged portion 64 and is disposed intermediate the support 12 and a concave cross-sectional guide plate 68. An idler roller 70 is mounted on the intermediate shaft 60 adjacent the guide plate 68. The idler roller 70 is provided with ball bearings 72 to facilitate the rotation thereof about the intermediate shaft 60.

A second elongated guide plate 74 is carried by the intermediate shaft 60 outwardly of the intermediate roller 70. The guide plate 74 is of a concave cross-section, as is clearly shown in FIGURE 3. A flat washer 76 is disposed outwardly of the guide plate 74. Each of the intermediate shafts 60 is provided with an externally threaded end portion 78 on which a nut 80 is threadedly engaged. The nut 80 serves to retain the entire roller assembly and guide plates in place.

Unlike the sprockets 26 and 42, the rollers 70 will be smooth. However, if it is so desired, the rollers 70 may be provided with an interlocking surface and be in the form of sprockets which will engage the tread 54 of the endless track member 50.

It is to be noted that the guide plates 68 and 74 extend the full length of the space between the guide plates 28 and 44. Further, the end portions of the guide plates 68 and 74 are configurated so as to partially pass around the guide plates 28 and 44 and thus substantially continuously guide the endless track member 50 throughout its entire length.

The mounting of the idler sprocket 42 on the idler shaft 18 may be identical with the mounting of the roller 70 on the intermediate shaft 60. For that reason, the details of the idler shaft 18 and the idler sprocket 42 have not been more completely illustrated. Also, it is to be understood that the shaft 16 extends entirely through the endless track assembly 10 and terminates outside of the guide plate 74. In this manner the endless track assembly 10 is much better supported.

Although a separate support shaft 16 and a separate drive shaft 14 have been illustrated, if it is so desired, the support shaft 16 may be in the form of a housing and the drive shaft 14 may be in the form of a stub shaft with a suitable drive extending between the stub or drive shaft and a main drive shaft disposed within the housing. Of course, other types of drives may be readily devised without departing from the spirit of the invention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An endless track assembly comprising an elongated support, a shaft secured to said support adjacent each end of said support, a roller type support member carried by each of said shafts, an endless track member entrained over said roller type support members, circular side plates positioned on each of said shafts on opposite sides of said roller type support members retaining said endless track member on said roller type support members, elongated side plates extending substantially between said circular side plates and retaining said endless track member in alignment with said roller type support members, said elongated side plates each having an arcuate recess formed in each end complementary to, partially receiving and embracing the adjacent circular side plates wherein said circular and elongated side plates substantially guide and enclose the inner marginal portions of said track member throughout its entire length.

2. An endless track assembly comprising an elongated support, a shaft secured to said support adjacent each end of said support, a roller type support member carried by each of said shafts, an endless track member entrained over said roller type support members, circular side plates positioned on each of said shafts on opposite sides of said roller type support members retaining said endless track member on said roller type support members, elongated side plates extending substantially between said circular side plates and retaining said endless track member in alignment with said roller type support members, said elongated side plates each having an arcuate recess formed in each end complementary to, partially receiving and embracing the adjacent circular side plates wherein said circular and elongated side plates substantially guide and enclose the inner marginal portions of said track member throughout its entire length, and at least one additional roller disposed intermediate said elongated side plates and within said endless track members, said additional roller supporting intermediate portions of said endless track member.

3. An endless track assembly comprising an elongated support, a shaft secured to said support adjacent each end of said support, a roller type support member carried by each of said shafts, an endless track member entrained over said roller type support members, circular side plates positioned on each of said shafts on opposite sides of said roller type support members retaining said endless track member on said roller type support members, elongated side plates extending substantially between said circular side plates and retaining said endless track member in alignment with said roller type support members, said elongated side plates each having an arcuate recess formed in each end complementary to, partially receiving and embracing the adjacent circular side plates wherein said circular and elongated side plates substantially guide and enclose the inner marginal portions of said track member throughout its entire length, and at least one additional roller disposed intermediate said elongated side plates and within said endless track members, said additional roller supporting intermediate portions of said endless track member, said endless track member being of a tubular construction.

4. An endless track assembly comprising an elongated support, a shaft secured to said support adjacent each end of said support, a roller type support member carried by each of said shafts, an endless track member entrained over said roller type support members, a pair of circular side plates on each of said shafts on opposite sides of said roller type support members retaining said endless track member on said roller type support members, elongated side plates extending substantially between said roller type support members retaining said endless track member in alignment with said roller type support members, said elongated side plates each having an arcuate recess formed in each and complementary to, partially receiving and embracing the adjacent circular side plates wherein said circular and elongated side plates substantially guide and enclose the inner marginal portions of said track member throughout its entire length.

5. The combination of claim 4 including at least one additional shaft carried by said support, a roller carried by said additional support disposed within said endless track member and supporting intermediate portions of said endless track member.

6. The combination of claim 4 wherein said endless track member is of resilient tubular construction, said circular side plates each having a convex surface opposing the other plate of each pair of plates to form a truncated cone-shaped recess in which the inner marginal portion of said endless track member is snugly received, said elongated side plates also being dished in transverse cross-section and disposed with the convex surfaces opposing each other to form opposed channels truncated and cone-shaped in cross-section in which the adjacent inner marginal portions of said endless track member is snugly received.

References Cited in the file of this patent

UNITED STATES PATENTS

| | | |
|---|---|---|
| 2,149,278 | Christmas | Mar. 7, 1939 |
| 2,337,074 | Walker | Dec. 21, 1943 |
| 2,735,727 | Bonmartini | Feb. 21, 1956 |
| 2,867,480 | Cushman | Jan. 6, 1959 |
| 2,886,378 | Anderson | May 12, 1959 |
| 2,900,210 | Parsons | Aug. 18, 1959 |

FOREIGN PATENTS

| | | |
|---|---|---|
| 622,337 | France | Feb. 26, 1927 |
| 680,523 | Great Britain | Oct. 8, 1952 |